United States Patent
Obika

(10) Patent No.: US 7,851,705 B2
(45) Date of Patent: Dec. 14, 2010

(54) INSULATED WIRE

(75) Inventor: Ryousuke Obika, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/348,626

(22) Filed: Jan. 5, 2009

(65) Prior Publication Data

US 2009/0120659 A1 May 14, 2009

(51) Int. Cl.
*H01B 7/00* (2006.01)
(52) U.S. Cl. .................................. 174/120 R
(58) Field of Classification Search ............. 174/120 R
See application file for complete search history.

(56) References Cited

U.S. PATENT DOCUMENTS

| | | | |
|---|---|---|---|
| 4,012,555 A * | 3/1977 | Keske | .................. 428/383 |
| 4,716,079 A | 12/1987 | Sano et al. | |
| 5,219,657 A | 6/1993 | Ueoka et al. | |
| 2002/0043391 A1 | 4/2002 | Suzuki et al. | |

FOREIGN PATENT DOCUMENTS

| JP | 55-80208 A | 6/1980 |
|---|---|---|
| JP | 56-15511 A | 2/1981 |
| JP | 58-186107 A | 10/1983 |
| JP | 61-269808 A | 11/1986 |
| JP | 62-200605 A | 9/1987 |
| JP | 63-29412 A | 2/1988 |
| JP | 63-119109 A | 5/1988 |
| JP | 1-307110 A | 12/1989 |
| JP | 2-197015 A | 8/1990 |
| JP | 4-342904 A | 11/1992 |
| JP | 5-266720 A | 10/1993 |
| JP | 9-45143 A | 2/1997 |
| JP | 2002-75066 A | 3/2002 |
| JP | 2002-124132 A | 4/2002 |

* cited by examiner

*Primary Examiner*—Chau N Nguyen
(74) *Attorney, Agent, or Firm*—Birch, Stewart, Kolasch & Birch, LLP

(57) ABSTRACT

An insulated wire, containing a metallic conductor, an insulating coating layer formed thereon, and a self-lubricating layer formed as an outermost layer on the insulating coating layer; in which the self-lubricating layer is made by mixing a polyamideimide resin coating with a stabilized isocyanate compound, a wax and an antioxidant; and in which a resin coating layer composed of the insulating coating layer and the self-lubricating layer has a dynamic hardness DH represented by formula, $DH=3.8584 \times P/(D \times D)$, of 0.6 or more; in which P (mN) represents a load when a triangular pyramid indenter with tip angle of 115° is pressed against the surface of the resin coating layer, and D (μ.m) represents the indentation depth by the triangular pyramid indenter to the surface of the resin coating layer.

6 Claims, 1 Drawing Sheet

INSULATED WIRE

This non-provisional application claims priority under 35 U.S.C. §119(a) on Patent Application No. 2006-188669 filed in Japan on Jul. 7, 2006, which is herein incorporated by reference.

TECHNICAL FIELD

The present invention relates to an insulated wire.

BACKGROUND ART

Insulated wires coated with an electrical insulator are used in a large amount in many applications as coils incorporated into a variety of electric machinery and tools. Many insulated wires are used especially in electric machinery and tools, represented by motors and transformers. In recent years, progress has been made in both miniaturization and the level of performance characteristics of these machinery and tools, and now such insulated wires are often used by bundling them into a very narrow space. Specifically, it is no exaggeration to say that the performance of a rotator, such as a motor, is determined by how many wires are held in a cross section of a stator slot. As a result of this, the ratio (space factor) of the sectional area of a conductor to the sectional area of the stator slot has been highly increased in recent years.

When insulated wires whose cross section has a round shape are closely packed inside of a stator slot, there are problems about voids forming dead space and the sectional area of an insulating film. For avoiding this, in order to improve the space factor as much as possible, users push the wires into the stator slot to such an extent that the wires having a cross section of a round shape are deformed. However, as expected, remarkable reduction in the sectional area of the insulating film has not been made, because it may sacrifice electrical performance (e.g. dielectric breakdown).

From the result, as means for improving the space factor, an attempt has been made, very recently, to use a rectangular wire with a conductor having a sectional shape similar to a quadrangle (a regular square or a rectangle). Use of the rectangular wire brings about a dramatic improvement in the space factor. However, it is difficult to apply an insulating film uniformly on a rectangular conductor, and it is particularly difficult to control the thickness of the insulating film in the case of insulated wire having a small sectional area. Therefore, the rectangular wire has not been widely used so much.

Various methods are proposed to provide the wire film with winding processing property. These methods include one in which lubricity is imparted to a film, to lower the friction coefficient, thereby decreasing external damage during coiling, and a method in which adhesion between a film and an electric conductor is improved, to prevent the film from peeling from the conductor, thereby maintaining the electrical insulating property.

As the method of imparting lubricating ability, a method in which the surface of a wire is coated with a lubricant, such as wax, or a method in which a lubricant is added in an insulating film and then is allowed to breed out on the wire surface when a wire is produced, thereby imparting lubricating ability, is conventionally adopted and there are many examples.

First, among these means that have been hitherto used, as the method of reducing the friction coefficient of the surface of an insulating film, it is proposed that a wax, an oil, a surfactant, a solid lubricant, or the like is coated on the surface of an insulated wire. It is also known that an anti-friction agent made of a wax that can be emulsified in water and a resin that can be emulsified in water and solidified by heating, is coated and baked, and then the resultant is used. Furthermore, suggested are a method of adding polyethylene fine powder to an insulating coating itself, thereby attaining lubrication, a method of blending a wax component and a crosslinking agent with an insulating coating, and the like.

The above-mentioned methods have been contrived to improve the surface lubricity of an insulated wire so as to improve the winding processing property by the surface slipping of the wire.

DISCLOSURE OF THE INVENTION

In the method of adding a lubricant component, the self-lubricity (the friction coefficient) of the wire is improved by action of the lubricant component. However, under a high pressure when the space factor is made higher, the lubricity is not improved.

A subject of the present invention is to provide an insulated wire having good lubricity even under a high pressure for use as a coil in a motor, a transformer or the like, high space factor, good winding processing property, and an excellent insulation resistance.

The inventor has found out, as an insulated wire for attaining the above-mentioned subject, an insulated wire in which a self-lubricating layer is formed as its outermost layer, and a resin coating layer containing said layer has a dynamic hardness (DH) of 0.6 or more.

According to the present invention, there is provided the following means:

(1) An insulated wire, comprising a metallic conductor, an insulating coating layer formed thereon, and a self-lubricating layer formed as an outermost layer on the insulating coating layer by, for example, coating and baking;

wherein the self-lubricating layer is made by mixing a polyamideimide resin coating with a stabilized isocyanate compound, a wax and an antioxidant; and wherein a resin coating layer composed of the insulating coating layer and the self-lubricating layer has a dynamic hardness DH represented by formula (I) of 0.6 or more:

$$DH = 3.8584 \times P/(D \times D) \qquad \text{Formula (1)}$$

wherein P (mN) represents a load when a triangular pyramid indenter with tip angle of 115° is pressed against the surface of the resin coating layer, and D (μm) represents the indentation depth by the triangular pyramid indenter to the surface of the resin coating layer, (2) The insulated wire described in the above item (1), wherein the wax is a polyethylene wax;

(3) The insulated wire described in the above item (1) or (2), wherein a tin catalyst is further mixed with the polyamideimide resin coating in an amount of 0.05 to 5.0 mass parts based on 100 mass parts of the polyamideimide resin; and (4) The insulated wire described in the above item (3), wherein the tin catalyst is dibutyltin dilaurylate.

Other and further features and advantages of the invention will appear more fully from the following description, appropriately referring to the accompanying drawing.

BEST MODE FOR CARRYING OUT THE INVENTION

Figure 1:
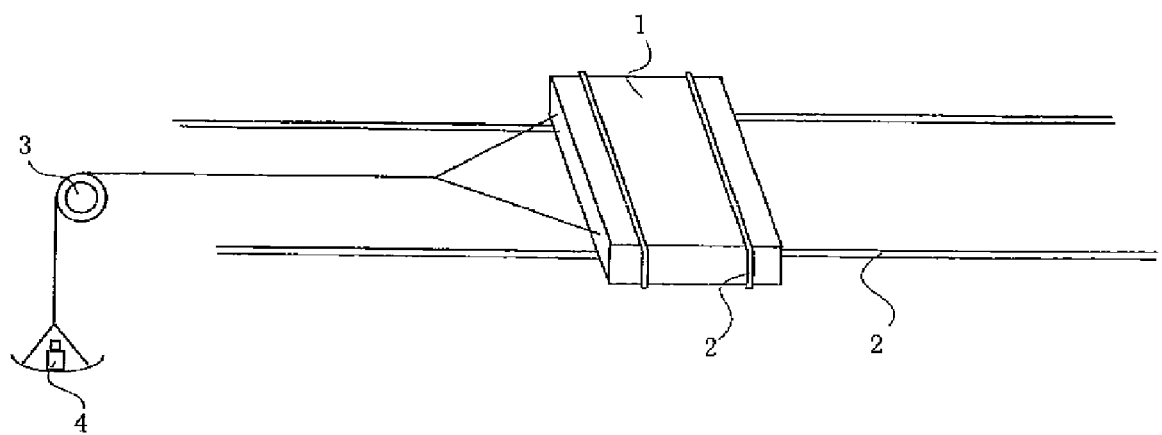
FIG. 1 shows a drawing of a measuring instrument for determining the static friction coefficient.

The insulated wire of the present invention is described in detail below.

The insulated wire of the present invention has a constitution in which an insulating coating layer as an inner layer is formed on a metallic conductor and a self-lubricating layer as an outermost layer is formed on the insulating coating layer by, for example, panting and baking.

The insulating coating layer formed on the metallic conductor may be any layer as long as the layer is made of an insulating coating which is ordinarily used as an insulating coating for insulated wires. Example of the insulating coating include an insulating coating made of a polyester, a heat-resistant modified polyester, a polyurethane, a polyesterimide, a polyamideimide, a polyimide or the like. The insulating coating layer may be made of only one of these insulating coatings or a combination of two or more thereof. Among these, a heat-resistant polyester, or a polyamideimide is preferred.

In the present invention, the coating to be used to form the insulating self-lubricating layer as an outermost layer is a polyamideimide resin coating.

There is no limitation to the polyamideimide as a basic resin. There can be used a polyamideimide, for example, obtained by direct reaction of a tricarboxylic acid anhydride and diisocyanates in a polar solvent or obtained by reacting a tricarboxylic acid anhydride with diamines in a polar solvent to introduce imide bonds and then carrying out amidation with diisocyanates, in a usual manner.

As the tricarboxylic acid anhydride that can be used for preparing this basic resin for the coating, a trimellitic acid anhydride is generally used. In this case, a part of the amount of the tricarboxylic acid anhydride may be replaced by a tetracarboxylic acid anhydride when it is reacted.

As the tetracarboxylic acid anhydride in this case, use can be made, for example, of pyromellitic acid dianhydride, 3,3',4,4'-benzophenonetetracarboxylic acid dianhydride, or the like. Further, a part of the amount of the tricarboxylic acid anhydride may be replaced by another acid or acid anhydride, for example, trimellitic acid, isophthalic acid or terephthalic acid.

On the other hand, examples of the diisocyanates that can be reacted with the tricarboxylic acid anhydride, include aromatic diisocyanates such as 4,4-diphenylmethane diisocyanate and tolylene diisocyanate, and examples of the diamine include aromatic diamines such as m-phenylenediamine, 4,4'-diaminodiphenyl ether, 4,4'-diaminodiphenylmethane, 4,4'-diaminodiphenylsulfon and 4,4'-diaminobenzophenone.

Further, for the imidation, N,N'-dimethylformamide may be used. Further, as the polar solvent, N-methyl-2-pyrrolidone can be preferably used. Examples of a commercially available polyamideimide solution include HI405 and HI406 (trade names, manufactured by Hitachi Chemical Co., Ltd.).

The polyamideimide resin coating for forming the self-lubricating layer as an outermost layer in the present invention is a coating in which a wax as a lubricant, an antioxidant and a stabilized isocyanate compound are added to the polyamideimide resin coating.

The wax is not particularly limited as long as the wax is belonging to any one of natural wax, aliphatic acid ester wax, aliphatic acid amide wax, and polyolefin wax. One kind of the wax may be used singly, or two or more kinds thereof may be used together.

Examples of the natural wax include carnauba wax, lanoline wax, beeswax, montan wax, candelilla wax, rice wax, ceresin, and spermaceti.

Examples of the polyolefin wax include polyethylene wax, polypropylene wax, and Fischer Tropsch wax.

Of these waxes, polyethylene wax is preferably used. The polyethylene to be used preferably has a molecular weight of 1,000 to 10,000 and a density of 0.90 to 1.00, more preferably a molecular weight of 2,000 to 8,000 and a density of 0.92 to 0.99. The polyethylene may be an oxidized polyethylene in which the molecule is partially oxidized and modified.

Examples of such a polyethylene include HIGHWAX 800P, 400P, 200P, 720P, 410P, 420P, 320P, 210P, 220P, 111P, 405MP, 310P, 320MP, 210MP, 220MP, 4051E, 4052E, 4202E, 1105A and 2203A (each trade name, manufactured by Mitsui Chemicals, Inc.); SUNWAX 131P, 151P, 161P, 165P, 171P, E310, E330, E250P, LEL250, LEL800 and LEL400P (each trade name, manufactured by Sanyo Chemical Industries, Ltd.); and AC6, AC7, AC8, AC9, AC15, AC16, AC617, AC715, AC725, AC725, AC735, AC307, AC316, AC325, AC330, AC392 and AC395 (each trade name, manufactured by Allied-Signal Inc.).

The mixing amount of the wax is preferably from 0.5 to 10.0 mass parts, more preferably from 1.0 to 5.0 mass parts, based on 100 mass parts of the basic polyamideimide resin. If this amount is too small, the lubricity is not sufficiently improved. If the amount is too large, there are caused problems such that the external appearance of the wire surface obtained by baking deteriorates.

The antioxidant is an agent for restraining the oxidation or decomposition of the polyethylene as a lubricant, when the self-lubricating insulating film is formed by coating and baking. Examples thereof include hindered phenol-based antioxidants, amine-based antioxidants, sulfur-based antioxidants, and triazole-based antioxidants.

Examples of such an antioxidant include IRGANOX 245, IRGANOX 259, IRGANOX 565, IRGANOX 1010, IRGANOX 1035, IRGANOX 1076, IRGANOX 1098, IRGANOX 1222, IRGANOX 1330, IRGANOX 1425, IRGANOX 3114, IRGANOX 5057, IRGANOX 1520, IRGANOX 1135, IRGANOX MD1135 and IRGANOX PS800FL (each trade name, manufactured by Ciba-Geigy Corp.); and NOCRAC 200, NOCRAC NS-5, NOCRAC NS-6, NOCRAC NS-30 and NOCRAC PBK (each trade name, manufactured by OUCHISHINKO CHEMICAL INDUSTRIAL CO., LTD.).

The mixing amount of the antioxidant is preferably from 0.5 to 10.0 mass parts, more preferably from 1.0 to 5.0 mass parts, based on 100 mass parts of the basic polyamideimide resin. If this amount is too small, a sufficient antioxidation performance for the polyethylene or the like cannot be obtained so that the wax is oxidized and it causes to lower the lubricity of the wire. If the amount is too large, there are caused problems such that the external appearance of the wire surface obtained by baking deteriorates.

The stabilized isocyanate compound represented by a polyisocyanate having a high molecular weight in which trimethylolpropane is caused to react with diphenylmethane diisocyanate and one of two terminal groups of the diphenylmethane diisocyanate is stabilized with a masking agent such as phenol or s-caprolactam; and a polyisocyanate having a low molecule isocyanate in which terminal groups of diphenylmethane diisocyanate are stabilized with a masking agent such as phenol or ∈-caprolactam. However, the stabilized isocyanate compound is not limited thereto.

The mixing amount of the stabilized isocyanate compound is preferably from 0.1 to 15 mass parts, more preferably from 1.0 to 10.0 mass parts, based on 100 mass parts of the polyamideimide resin. If the amount is too small, the effect of heightening the dynamic hardness of the wire surface is small. If the amount is too large, the abrasion resistance of the wire deteriorates.

It is preferred to add a tin catalyst to the polyamideimide resin coating for forming the self-lubricating layer in the present invention.

Examples of the tin catalyst include dibutyltin dilaurylate, and tin octylate. The mixing amount of the tin catalyst is preferably from 0.05 to 5.0 mass parts, more preferably from 0.1 to 3.0 mass parts, based on 100 mass parts of the basic polyamideimide resin. If the amount is too small, a sufficient catalyst performance is not obtained for crosslinking and hardening. If the amount is too large, there are caused problems such that the viscosity of the varnish increases or the stability of the varnish deteriorates.

Ordinarily used various additives may be appropriately mixed with the polyamideimide resin coating for forming the self-lubricating layer in the present invention as long as the excellent advantageous effects of the present invention are not damaged. Examples of the additives include a flame retardant (auxiliary agent), a metal deactivator, a colorant, and an inorganic filler.

The metallic conductor used in the present invention may be any material that can be used for a conductor for electric wires, such as copper, nickel-plated copper, aluminum, gold, gold-plated copper, or silver. An arbitrary insulating coating, which will be an inner layer, is coated on the metallic conductor, and the coating is baked ordinarily at a temperature of 400 to 600° C. The thickness of the insulating coating layer as the inner layer varies in accordance with the size of the metallic conductor or the like, and is preferably from 10 to 50 μm. Next, the polyamideimide resin coating for forming the above-mentioned self-lubricating layer is coated outside, and then the resin coating is baked ordinarily at a temperature of 400 to 600° C. to form the insulating self-lubricating layer having usually a thickness of 2 to 6 μm.

In the insulated wire of the present invention, a resin coating layer composed of the insulating coating layer as an inner layer, and the self-lubricating layer formed as an outermost layer, has a dynamic hardness (DH) of 0.6 or more, preferably 0.7 or more.

This dynamic hardness (DH) is represented by formula (1):

$$DH = 3.8584 \times P/(D \times D) \quad \text{Formula (1)}$$

wherein P (mN) represents a load when a triangular pyramid indenter with tip angle of 115° is pressed against the surface of the resin coating layer, and D (μm) represents the indentation depth by the triangular pyramid indenter to the surface of the resin coating layer.

The dynamic hardness represented by formula (1) is an index representing easiness of the deformation of the resin coating layer of the insulated wire. If this dynamic hardness of the resin coating layer of the insulated wire is too low, the resin coating layer largely deforms so that the lubricity under a heavy load deteriorates. If the hardness is too high, the flexibility of the resin coating layer is lost. Thus, the dynamic hardness is preferably about 1.3 or less.

In the insulated wire of the present invention, the static friction coefficient under a light load and the static friction coefficient under a heavy load are improved (in other words, the static friction coefficient does not increase even under a heavy load). Therefore, according to the present invention, it is possible to remarkably improve winding processing property at a high space factor, an excellent advantageous effect for insulation resistance is also obtained at a high space factor, and the insulated wire of the present invention is good in the external appearance.

EXAMPLES

The present invention will be described in more detail based on examples and the like given below, but the present invention is not meant to be limited by these examples.

Examples 1 and 2

Comparative Examples 1 to 3

To 100 mass parts of a polyamideimide coating HI 406 (trade name, manufactured by Hitachi Chemical Co., Ltd.) were added a polyethylene wax, an antioxidant (trade name: IRGANOX 1098, manufactured by Ciba-Geigy Corp.), dibutyltin dilaurylate, and a stabilized isocyanate (trade name: MILLIONATE MS-50, manufactured by Nippon Polyurethane Industry Co., Ltd.), the amount of each of which is shown in Table 1 (unit: mass part(s)). The components were sufficiently stirred and mixed with each other to prepare self-lubricating insulating coating of Examples 1 and 2 and Comparative Example 1 to 3. Herein, no stabilized isocyanate was mixed in Comparative Examples 1 and 2, and no tin catalyst was mixed in Comparative Example 2.

A trishydroxyethyl isocyanurate (THEIC)-modified polyester insulating coating (trade name: Isone 1200, manufactured by Schenectady International inc. in U.S.A.) for forming an inner layer was coated and baked several times onto a copper wire having a conductor diameter of 1.0 mm, so as to make the coating film thickness of the insulating coating layer as the inner layer into 32 μm. Furthermore, on this layer, each of the above-mentioned self-lubricating insulating coatings was coated and baked, so as to form a self-lubricating layer having a coating film thickness of 3 μm as an outermost layer. In this way, each of insulated wires of Examples 1 and 2 and Comparative Examples 1 to 3, which had an insulating resin coating layer in 35 μm thickness, was produced.

Properties of each of the thus-obtained insulated wires of Examples 1 and 2 and Comparative Examples 1 to 3 were tested.

The static friction coefficient thereof was obtained as follows: As illustrated in FIG. 1, two insulated wires 2 were set on a horizontal stand, and a load 1, in which another two insulated wires 2 were set on the bottom of the load, was set thereon, to bring the insulated wires 2 on the stand into contact with the insulated wires 2 of the load in directions perpendicular to each other. When the load 1 started, the load F of the weight 4 was measured. The static friction coefficient was then calculated from an expression: static friction coefficient=F/W (in which F represents the force (kgW) required when the load was pulled in the horizontal direction, and W represents the mass (kg) of the load 1). In FIG. 1, reference number 3 represents a pulley.

When the weight of the load 1 or set to 1 or 3 kg, the load of the weight 4 was measured.

The dynamic hardness of the resin coating layer in each of the insulated wires was obtained as follows: A Shimadzu dynamic ultra micro hardness tester (manufactured by Shimadzu Corp.) was used, and its triangular pyramid indenter (tip angle: 115°) was pressed against the resin coating layer at a load speed of 0.0145 g/sec. When the load reached 1 gf, the indentation depth of the indenter was measured. The value was used to calculate out the dynamic hardness from formula (1).

These results obtained are shown in Table 1.

TABLE 1

|  |  | Example 1 | Example 2 | Comparative Example 1 | Comparative Example 2 | Comparative Example 3 |
| --- | --- | --- | --- | --- | --- | --- |
| Material of inner layer | | THEIC-modified polyester | THEIC-modified polyester | THEIC-modified polyester | THEIC-modified polyester | THEIC-modified polyester |
| Material of self-lubricating outer layer | Polyamideimide (HI 406) | 100 | 100 | 100 | 100 | 100 |
| | Polyethylene wax | 2.0 | 4.0 | 4.0 | 2.0 | 4.0 |
| | Antioxidant (IRGANOX 1098) | 2.0 | 4.0 | 4.0 | 2.0 | 4.0 |
| | Dibutyltin dilaurylate | 0.5 | 1.5 | 1.5 | — | 1.5 |
| | Stabilized isocyanate compound (MILLIONATE MS50) | 5 | 3 | — | — | 20 |
| Dynamic hardness of the resin coating layer [—] | | 0.9 | 0.75 | 0.5 | 0.3 | 0.3 |
| Static friction coefficient [—] Load 1 kg | | 0.05 | 0.04 | 0.04 | 0.06 | 0.04 |
| Static friction coefficient [—] Load 3 kg | | 0.04 | 0.04 | 0.07 | 0.08 | 0.07 |

From the above results, in Comparative Examples 1 to 3, the dynamic hardness was low, and the static friction coefficient under the heavy load was largely increased compared with that under the light load. On the other hand, in Examples 1 and 2 of the present invention, the dynamic harness was high and good, and the static friction coefficient under the heavy load was not varied or was reduced from that under the Fight load. Thus, it is understood that the lubricity was good under the heavy load and the winding processing property was good at a high space factor, in the wires according to the present invention.

INDUSTRIAL APPLICABILITY

The insulated wire of the present invention is suitable as a coli for motors, transformers or the like, and is excellent in winding processing property.

Having described our invention as related to the present embodiments, it is our intention that the invention not be limited by any of the details of the description, unless otherwise specified, but rather be construed broadly within its spirit and scope as set out in the accompanying claims.

The ivention claimed is:

1. An insulated wire, comprising a metallic conductor, an insulating coating layer formed thereon, and a self-lubricating layer formed as an outermost layer on the insulating coating layer;
   wherein the self-lubricating layer is made by mixing a polyamideimide resin coating with a stabilized isocyanate compound, a wax and an antioxidant; and
   wherein a resin coating layer composed of the insulating coating layer and the self-lubricating layer has a dynamic hardness DH represented by formula (1) of 0.6 or more:

$$DH = 3.8584 \times P/(D \times D) \qquad \text{Formula (1)}$$

wherein P (mN) represents a load when a triangular pyramid indenter with tip angle of 115° is pressed against the surface of the resin coating layer, and D (μm) represents the indentation depth by the triangular pyramid indenter to the surface of the resin coating layer; and
   wherein a tin catalyst is further mixed with the polyamideimide resin coating in an amount of 0.05 to 5.0 mass parts based on 100 mass parts of the polyamideimide resin.

2. The insulated wire according to claim 1, wherein the wax is a polyethylene wax.

3. The insulated wire according to claim 1, wherein the tin catalyst is dibutyltin dilaurylate.

4. The insulated wire according to claim 1, wherein the insulating coating layer is made by coating and baking an insulating coating on the metallic conductor.

5. The insulated wire according to claim 1, wherein the self-lubricating layer is formed by coating and baking the polyamideimide resin coating that is mixed with the stabilized isocyanate compound, the wax and the antioxidant, on the insulating coating layer.

6. The insulated wire according to claim 1, wherein the amount of the mixing amount of the stabilized isocyanate compound is from 0.1 to 15 mass parts based on 100 mass parts of the polyamideimide resin.

* * * * *

UNITED STATES PATENT AND TRADEMARK OFFICE
CERTIFICATE OF CORRECTION

PATENT NO. : 7,851,705 B2  
APPLICATION NO. : 12/348626  
DATED : December 14, 2010  
INVENTOR(S) : Ryousuke Obika Page 1 of 1

It is certified that error appears in the above-identified patent and that said Letters Patent is hereby corrected as shown below:

ON THE TITLE PAGE:

Please insert the following:

-- Related U.S. Application Data

(63) Continuation of application No. PCT/JP2007/063252, filed on Jul. 2, 2007.

(30)    Foreign Application Priority Data

Jul. 7, 2006   (JP) ....................... 2006-188669 --.

Signed and Sealed this
Fifteenth Day of November, 2011

David J. Kappos
*Director of the United States Patent and Trademark Office*